W. GARDINER.
STORAGE BATTERY CONSTRUCTION.
APPLICATION FILED JUNE 9, 1919.
1,342,952.
Patented June 8, 1920.
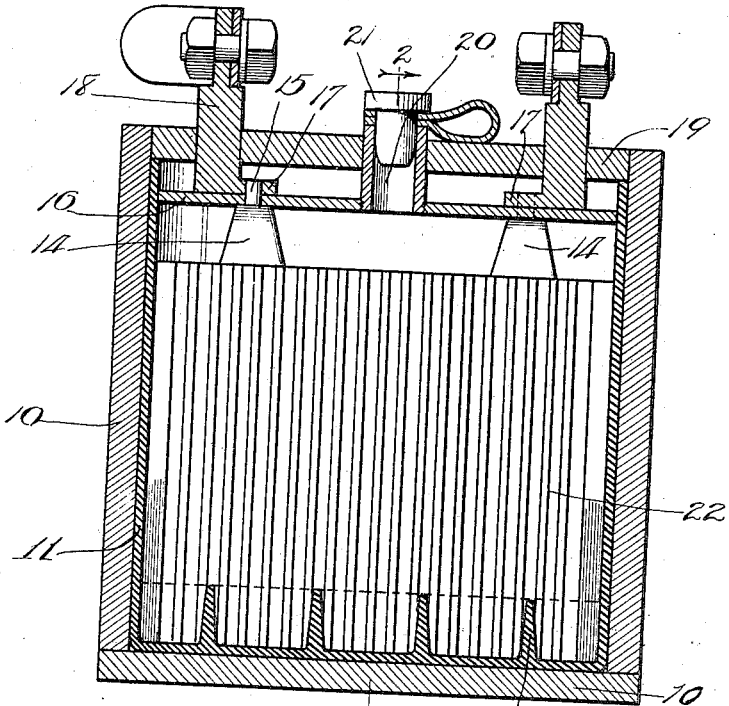
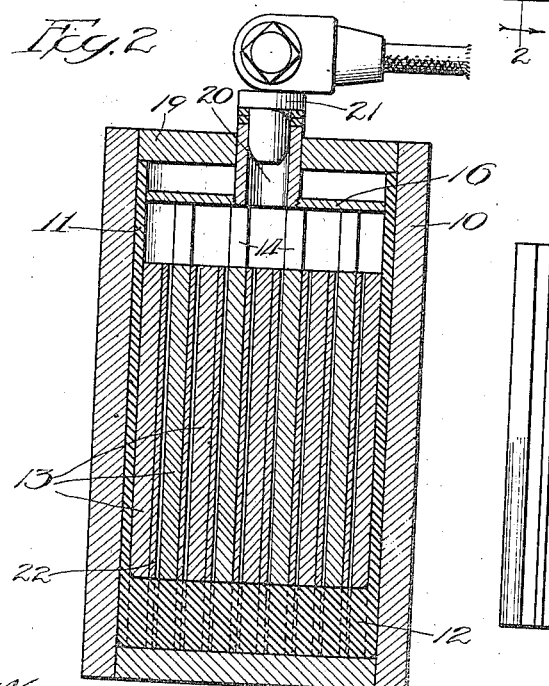
Fig. 2
Fig. 3
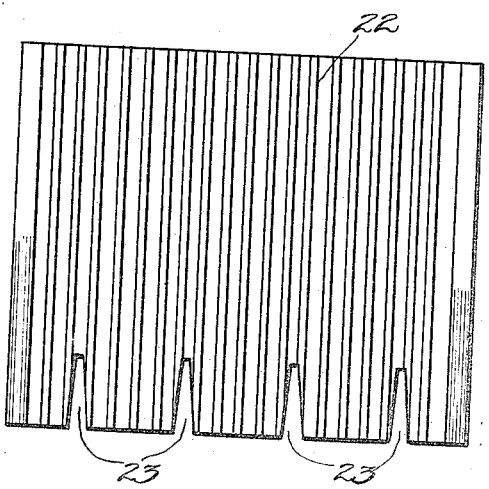
Witness:
Stephen T. Kebra
Inventor:
William Gardiner,
By Chas. E. Bulkley,
Attys

UNITED STATES PATENT OFFICE.

WILLIAM GARDINER, OF CHICAGO, ILLINOIS.

STORAGE-BATTERY CONSTRUCTION.

1,342,952.  Specification of Letters Patent.  Patented June 8, 1920.

Application filed June 9, 1919. Serial No. 302,720.

*To all whom it may concern:*

Be it known that I, WILLIAM GARDINER, a citizen of the United States of America, and resident of Chicago, Cook county, Illinois, have invented a certain new and useful Improvement in Storage-Battery Constructions, of which the following is a specification.

My invention relates to improvements in storage battery construction, and relates particularly to an improved construction for the separators which are located between the electrode plates. Heretofore, difficulty has been experienced in that during the operation of the battery these separator plates, which are usually made of treated wood, buckle or bend and thus the outer edges are drawn inward and leave a space between the electrode plates, where there is no separator, and the electrode plates are accordingly liable to come in contact and thus short-circuit the battery.

By my invention, I provide a separator which is firmly held in place so that buckling, or such longitudinal movement of the separator is impossible, and accordingly I obviate the danger of the electrode plates becoming short-circuited.

These and other features and objects of my invention will be more readily understood by having reference to the accompanying drawings, in which I have illustrated one embodiment of my invention.

Figure 1 is a transverse sectional view of a battery, embodying the features of my invention.

Fig. 2. is a sectional view taken on a plane at right angles to Fig. 1.

Fig. 3 is a front elevation of a separator plate.

As illustrated, the battery consists essentially of an outer containing box 10 of wood or other suitable material, having an insulating lining 11 of hard rubber. Projecting upwardly from the bottom of this lining, there is a series of insulating ridges 12, and supported within this container and resting upon these ridges 12 are a series of electrode plates 13. The electrode plates are thus supported above the bottom of the cell, and thus I eliminate the danger of short-circuiting of the plates, due to deposits which collect in the bottom of the containing cell. Each of these plates are provided with an upwardly extending terminal 14, the terminals on the positive plates being located at one side of the cell, and the terminals for the negative plates being located at the opposite sides of the cell. The upper ends of these terminals are provided with a reduced end portion 15, thus forming a shoulder upon which a cover plate 16 rests. A metallic bar 17, which rests on top of this plate 16, connects the positive electrodes together, and a corresponding bar connects the negative terminals together. Secured to one end of each of these bars, and extending upwardly, there is a terminal 18 which extends through a second cover plate 19. This cover is likewise provided with a central vent 20, closed by the cap 21.

Located between each of the electrode plates 13, there is a separator 22. This separator consists preferably of a sheet of treated wood, having one face grooved or corrugated to thereby form a plurality of air passage-ways to permit the escape of the gases liberated during the charging and discharging of the battery. Each of these separators are provided with a plurality of notches or cut-out portions 23 along the lower edge, which notches correspond to the ridges 12, which project upwardly from the bottom of the containing cell. When the separators are placed in position, these notched portions of the separator fit closely over the upwardly projecting ridges of the containing cell. Thus it will be seen that the separators extend below the lower edge of the electrode plates which rest on top of the ridges in the bottom of the cell. By reason of the fact that these separators fit snugly over these upwardly projecting ridges in the containing cell, they are firmly held against longitudinal movement. Therefore, during operation of the battery, the separators are prevented from warping or buckling, as, of course, any such warping action necessarily involves a certain longitudinal movement of sections of the separator. Therefore, by my construction there is no danger of the marginal edges of the separator being drawn inward by such warping action so as to leave a marginal portion where there is no separator between the electrode plates, but, by my construction, the separator always covers the entire area, being two adjacent electrode plates. In this manner, all danger of short-circuiting, due to the electrodes being forced into contact, is obviated.

It will thus be seen that I have devised a very efficient form of separator, and while I have illustrated same in connection with one particular form of battery, it will, of course, be understood that it is adapted for other forms of battery, and I do not wish to limit myself to any particular type of battery with which the same is employed.

What I claim as my invention is:

1. In a storage battery, a containing cell, a pair of electrode plates supported above the bottom of said cell, and a separator located between said plates and extending below the same and held against longitudinal movement at a plurality of points intermediate its ends.

2. In a storage battery, a containing cell having upwardly projecting ridges on the lower surface thereof, a plurality of electrode plates supported from said ridges, separators located between adjacent plates, and fitting over said ridges and extending below said plates, whereby said ridges operate to prevent longitudinal movement of said separators.

3. In a storage battery, a containing cell having a plurality of insulating ridges extending transversely across the bottom thereof, a plurality of electrode plates supported by said ridges and extending at a plane at right angles to said ridges, separators located between adjacent plates, each of said separators comprising a sheet of insulating material and being provided with notches corresponding to said ridges and fitting over the same and extending below said plates, whereby said ridges operate to hold said separators from longitudinal movement.

Signed at Chicago, Illinois, this 31st day of May, 1919.

WILLIAM GARDINER.